(12) United States Patent
Nicolle et al.

(10) Patent No.: US 7,360,362 B2
(45) Date of Patent: Apr. 22, 2008

(54) TWO-STAGE TURBOCHARGER SYSTEM WITH INTEGRATED EXHAUST MANIFOLD AND BYPASS ASSEMBLY

(75) Inventors: Frederic F Nicolle, Houdemont (FR); Christopher Wilkins, Golbey (FR); Magali M Capelli, Chatel sur Moselle (FR)

(73) Assignee: Honeywell International, Inc., Morristown, NJ (US)

( * ) Notice: Subject to any disclaimer, the term of this patent is extended or adjusted under 35 U.S.C. 154(b) by 6 days.

(21) Appl. No.: 11/337,018

(22) Filed: Jan. 20, 2006

(65) Prior Publication Data
US 2007/0169479 A1    Jul. 26, 2007

(51) Int. Cl.
*F02B 33/44* (2006.01)
(52) U.S. Cl. ........................................ 60/612
(58) Field of Classification Search ............. 60/612, 60/323; 123/562
See application file for complete search history.

(56) References Cited

U.S. PATENT DOCUMENTS

| | | | | |
|---|---|---|---|---|
| 3,576,102 A | * | 4/1971 | West ........................... | 60/602 |
| 4,457,376 A | * | 7/1984 | Carmody et al. ........ | 166/332.8 |
| 2004/0040300 A1 | | 3/2004 | Klingel | |
| 2007/0074513 A1 | * | 4/2007 | Lamb et al. ................. | 60/612 |

FOREIGN PATENT DOCUMENTS

| | | |
|---|---|---|
| DE | 10230934 A1 | 1/2004 |
| DE | 10149287 | 4/2004 |
| EP | 1411224 A1 | 10/2002 |
| JP | 61164039 A * | 7/1986 |
| JP | 2005120936 | 5/2005 |
| JP | 2005133651 | 5/2005 |
| WO | 0181744 A1 | 1/2001 |
| WO | 06121745 A1 | 11/2006 |

OTHER PUBLICATIONS

PCT ISR/WO PCT/US2007/001292.

* cited by examiner

*Primary Examiner*—Thomas Denion
*Assistant Examiner*—Douglas J. Duff
(74) *Attorney, Agent, or Firm*—Alston & Bird, LLP.

(57) ABSTRACT

A two-stage turbocharger system includes an exhaust manifold formed separately from the high-pressure and low-pressure turbine housings. The exhaust manifold defines a bypass passage, and a bypass valve is disposed in the bypass passage for opening and closing the passage. The exhaust manifold also defines an inter-turbine passage. The turbine housings of the high-pressure and low-pressure turbochargers are releasably connected to the exhaust manifold such that exhaust gas received into the exhaust manifold bypasses the high-pressure turbine and flows through the bypass passage to the low-pressure turbine when the bypass valve is in the open position, and the exhaust gas flows through the high-pressure turbine and then through the inter-turbine passage to the low-pressure turbine when the bypass valve is in the closed position.

11 Claims, 2 Drawing Sheets

US 7,360,362 B2

TWO-STAGE TURBOCHARGER SYSTEM WITH INTEGRATED EXHAUST MANIFOLD AND BYPASS ASSEMBLY

BACKGROUND OF THE INVENTION

The present invention relates to turbochargers, and more particularly relates to two-stage turbocharger systems.

The performance of internal combustion engines can be enhanced with the use of a turbocharger for increasing the pressure of the air supplied to the engine intake. In a simple turbocharger system, a single turbocharger is coupled with the engine. The turbocharger includes a turbine driven by exhaust gas from the engine exhaust manifold, and a compressor driven by the turbine for compressing air before it is delivered to the engine intake. The increased pressure of the intake air enables the engine to produce a greater amount of power.

In many engine systems, a single turbocharger is adequate. In other cases, however, it is desirable to provide maximum boost pressures that cannot readily be achieved with a single turbocharger. Accordingly, it is known to employ two turbochargers arranged in series. A low-pressure turbocharger is arranged in series with a high-pressure turbocharger, such that engine intake air is first compressed in the low-pressure compressor and is then further compressed in the high-pressure compressor. Exhaust gas from the engine is supplied to the high-pressure turbine for driving the high-pressure compressor, and to the low-pressure turbine for driving the low-pressure compressor. Typically the turbines are connected in series but a bypass passage is provided for bypassing the high-pressure turbine under certain operating conditions. A bypass valve is employed for selectively opening the bypass passage to bypass the high-pressure turbine, in which case the system operates as a single-stage system using only the low-pressure turbocharger to provide engine boost, or closing the bypass passage such that the two turbochargers operate in series to provide a higher level of boost.

The bypass valve in conventional two-stage turbocharger systems often is housed in the turbine housing of one of the turbochargers, or in a separate housing arranged between the engine exhaust manifold and the turbochargers. A separate duct is also provided for connecting the exhaust gas outlet of the high-pressure turbine housing to the exhaust gas inlet of the low-pressure turbine housing. Such arrangements become mechanically complex and entail multiple connections between components that are subject to leakage at flange joints. Special and costly sealing arrangements are often required to attempt to eliminate or reduce such leakage.

BRIEF SUMMARY OF THE INVENTION

The present invention addresses the above needs and achieves other advantages by providing a two-stage turbocharger system that includes an exhaust manifold formed separately from the high-pressure and low-pressure turbine housings. The exhaust manifold defines a bypass passage, and a bypass valve is disposed in the bypass passage for opening and closing the passage. The exhaust manifold also defines an inter-turbine passage. The turbine housings of the high-pressure and low-pressure turbochargers are releasably connected to the exhaust manifold. When the bypass valve is in the open position, exhaust gas received into the exhaust manifold bypasses the high-pressure turbine and flows through the bypass passage to the low-pressure turbine. When the bypass valve is in the closed position, the exhaust gas flows through the high-pressure turbine and then through the inter-turbine passage to the low-pressure turbine.

In one embodiment of the invention, the high-pressure turbine housing defines an exhaust gas inlet and an exhaust gas outlet, and the low-pressure turbine housing defines an exhaust gas inlet and an exhaust gas outlet. The exhaust gas inlet of the high-pressure turbine housing is coupled to a first end of the bypass passage of the exhaust manifold on one side of the bypass valve, and the exhaust gas inlet of the low-pressure turbine housing is coupled to a second end of the bypass passage on an opposite side of the bypass valve. A first end of the inter-turbine passage of the exhaust manifold is coupled to the exhaust gas outlet of the high-pressure turbine housing, and a second end of the inter-turbine passage is coupled to the exhaust gas inlet of the low-pressure turbine.

The exhaust manifold in one embodiment can comprise a one-piece component formed by casting and/or machining. In one embodiment of the invention, the exhaust manifold has a first end and an opposite second end. The first ends of the bypass passage and inter-turbine passage are defined at the first end of the exhaust manifold, and the second ends of the passages are defined at the second end of the exhaust manifold. The first end of the exhaust manifold defines a first flange for coupling with a flange of the high-pressure turbine housing, and the second end of the exhaust manifold defines a second flange for coupling with a flange of the low-pressure turbine housing.

In another aspect of the invention, the bypass valve can comprise a swing valve comprising a valve member held by a pivoting swing arm, and a valve seat disposed in the exhaust manifold for engagement by the valve member when the bypass valve is in the closed position.

In one embodiment of the invention, the valve seat comprises an insert formed separately from the exhaust manifold and mounted in the exhaust manifold. The valve seat can comprise a ring having a cylindrical portion and a radially outwardly extending flange joined to one end of the cylindrical portion. The exhaust manifold comprises a wall surrounding the bypass passage and defining an annular recess in which the cylindrical portion of the valve seat is received, the wall further defining a groove surrounding the recess. A resiliently compressible sealing ring is disposed in the groove and is compressed by the flange of the valve seat to form a sealed connection between the valve seat and the exhaust manifold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
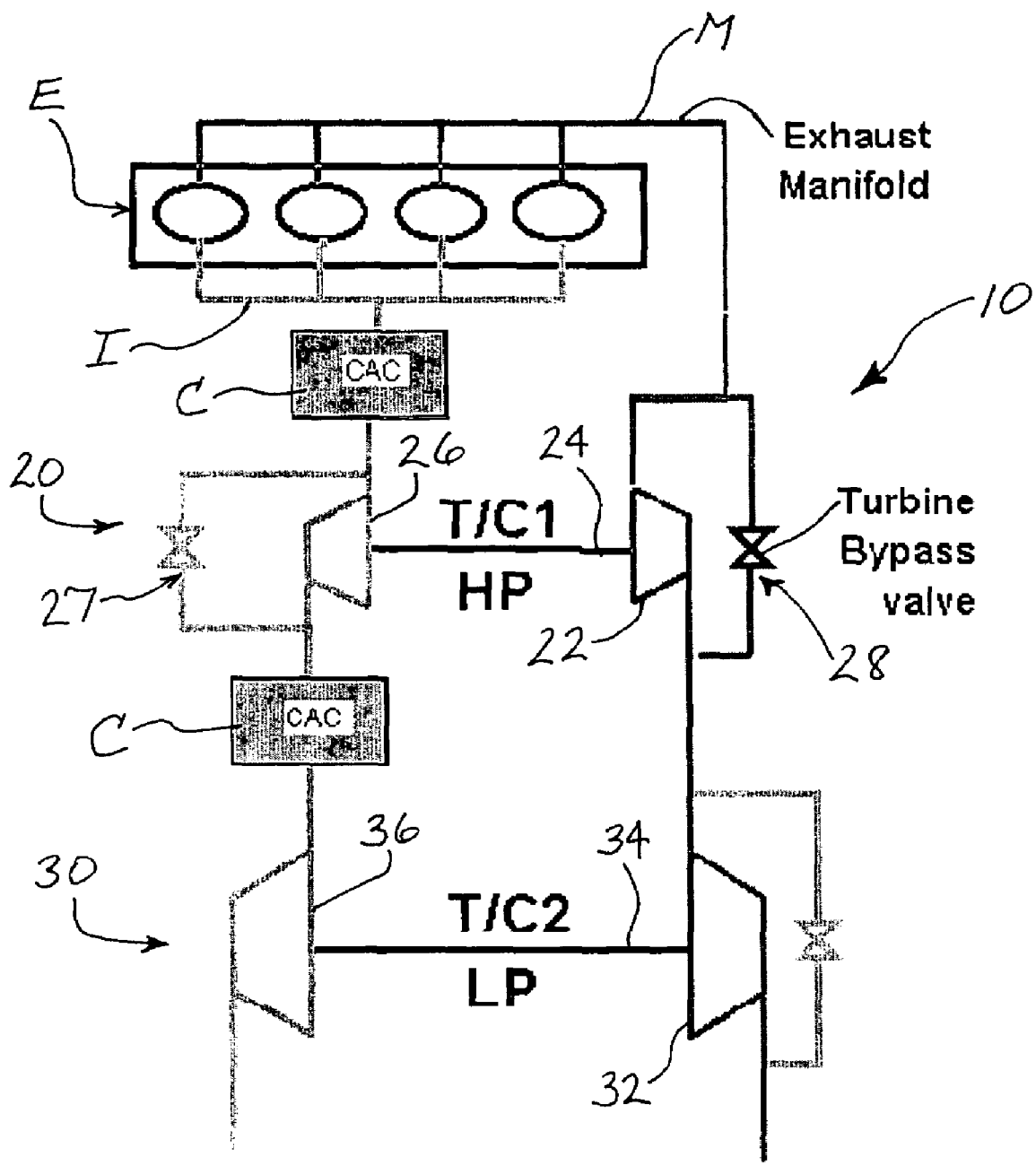
FIG. 1 is a diagrammatic illustration of a two-stage turbocharger system coupled with an internal combustion engine.

FIG. 1 is a schematic illustration of an internal combustion engine E to which a two-stage turbocharger system 10 is coupled for boosting performance of the engine. The turbocharger system 10 comprises a high-pressure turbocharger 20 and a low-pressure turbocharger 30. The high-pressure turbocharger comprises a high-pressure turbine 22 connected by a shaft 24 to a high-pressure compressor 26. The low-pressure turbocharger 30 comprises a low-pressure turbine 32 connected by a shaft 34 to a low-pressure compressor 36. The compressors 26, 36 are arranged in series such that air is compressed by the low-pressure compressor 36 and is then further compressed by the high-pressure compressor 26 before being delivered to the engine air intake I. Charge air coolers C can be included for cooling the air before it is supplied to the engine intake. The high-pressure compressor can include a bypass passage and valve 27 for selectively bypassing the high-pressure compressor under certain operating conditions.

The high-pressure turbine 22 is coupled with the engine exhaust manifold M for receiving exhaust gas from the engine. The turbines 22, 32 are arranged in series such that exhaust gas is first expanded in the high-pressure turbine 22 and then is further expanded in the low-pressure turbine 32. The high-pressure turbine includes a bypass passage and valve 28 for selectively bypassing the high-pressure turbine. When the bypass valves 27, 28 are opened, the high-pressure turbocharger 20 is effectively bypassed such that only the low-pressure turbocharger 30 operates to provide boost to the engine.

Figure 2:
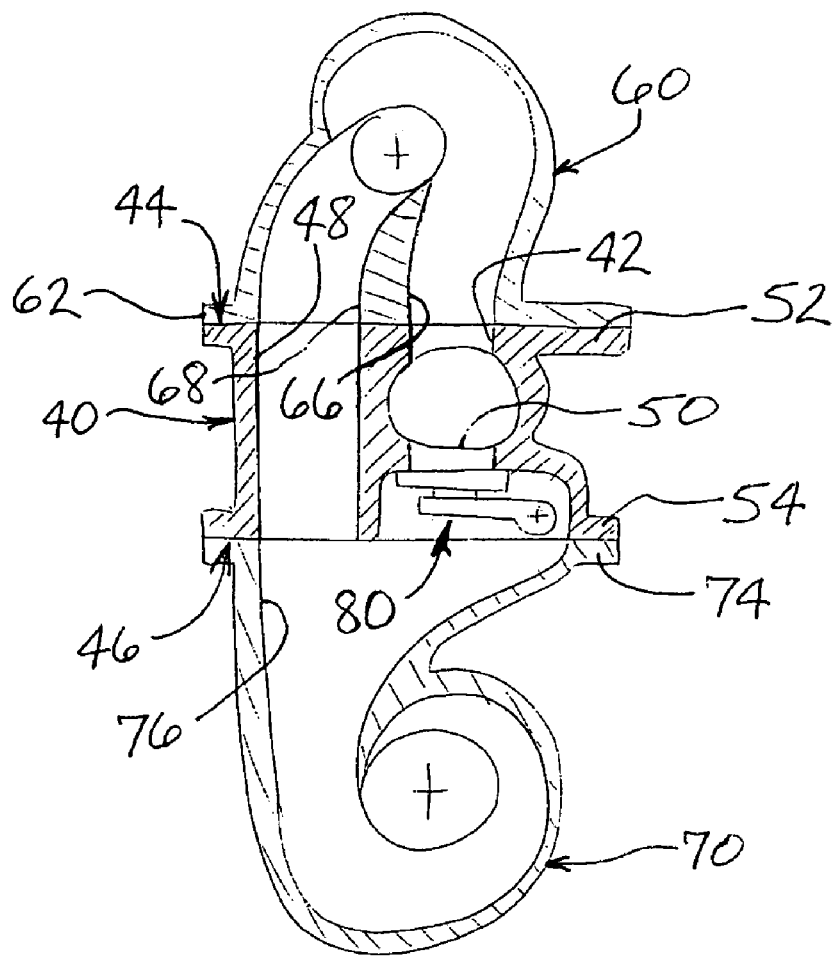
FIG. 2 is a cross-sectional view of the exhaust manifold connected to the turbine housings, in accordance with one embodiment of the invention.

FIG. 2 illustrates an embodiment of the invention providing an advantageous construction of the exhaust manifold and turbine housings enabling the turbines to be connected in a mechanically simple manner while facilitating the arrangement of the high-pressure turbine bypass passage and valve. An exhaust manifold 40 is provided, defining a bypass passage 42 extending through the manifold from a first end 44 of the manifold to an opposite second end 46 of the manifold. The manifold also defines an inter-turbine passage 48 that extends through the manifold from the first end 44 to the second end 46. The manifold further defines an exhaust gas inlet 50 that joins with the bypass passage 42 at a location intermediate the first and second ends 44, 46. The exhaust gas inlet 50 receives exhaust gas from the engine and supplies it into the bypass passage 42.

The manifold has a first flange 52 at the first end 44, and a second flange 54 at the opposite second end 46. The flanges 52, 54 facilitate coupling of the manifold to the high-pressure turbine housing 60 and the low-pressure turbine housing 70, respectively. More particularly, the high-pressure turbine housing defines a flange 62 for connection to the first flange 52 of the manifold, and the low-pressure turbine housing likewise defines a flange 74 for connection to the second flange 54 of the manifold.

The high-pressure turbine housing 60 defines an exhaust gas inlet 66 for receiving exhaust gas from the bypass passage 42 of the manifold 40. After the exhaust gas is expanded in the high-pressure turbine, the exhaust gas is discharged from an exhaust gas outlet 68 of the high-pressure turbine housing.

The low-pressure turbine housing 70 defines an exhaust gas inlet 76 for receiving exhaust gas from either the bypass passage 42 or the inter-turbine passage 48 of the manifold 40, depending on whether the bypass passage is open or closed. The exhaust gas outlet of the low-pressure turbine housing is not illustrated in FIG. 2.

The exhaust manifold 40 is releasably connected between the high-pressure turbine housing 60 and the low-pressure turbine housing 70, such as by clamping, bolting, or otherwise securing the flanges 52, 62 and the flanges 54, 74 together. The bypass passage 42 is thereby connected at a first end to the high-pressure turbine inlet 66 and at an opposite second end to the low-pressure turbine inlet 76. The inter-turbine passage 48 is connected at a first end to the high-pressure turbine outlet 68 and at an opposite second end to the low-pressure turbine inlet 76. In the illustrated embodiment, the second end of the bypass passage 42 and the second end of the inter-turbine passage 48 remain separate at the second end 46 of the manifold. Alternatively, the passages could merge at the second end 46 to form a single passage for coupling with the exhaust gas inlet of the low-pressure turbine housing.

Figure 3:
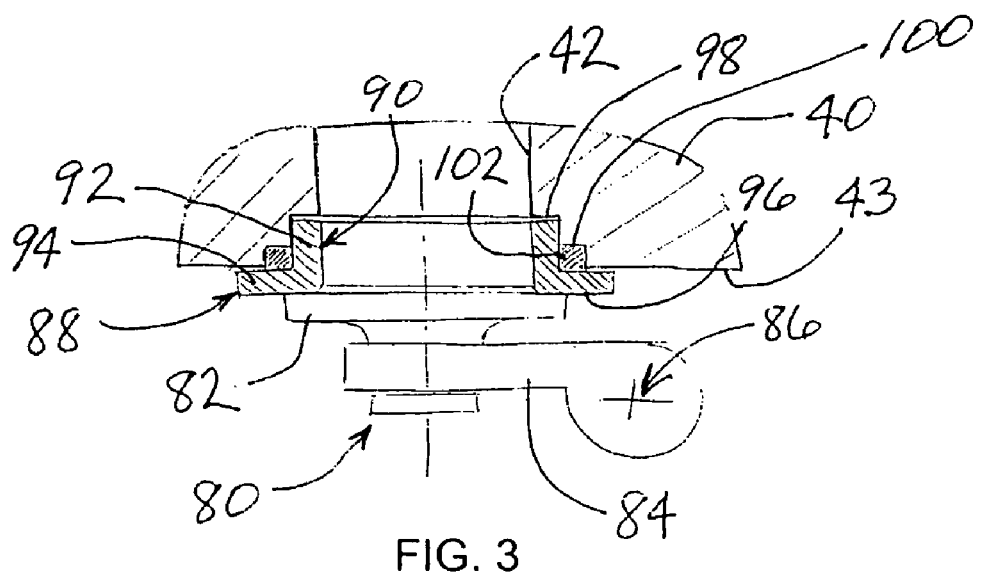
FIG. 3 is a magnified view of a portion of the exhaust manifold housing the bypass valve, showing details of the valve seat in accordance with one embodiment of the invention.

The exhaust manifold 40 includes a bypass valve 80 for selectively opening or closing the bypass passage 42. As shown in greater detail in FIG. 3, the bypass valve 80 in one embodiment comprises a swing valve having a valve member 82 held by a swing arm 84 that pivots about an axis 86 fixed in the manifold 40. The valve further comprises a valve seat 88 that is engaged by the valve member 82 to close the valve. The valve is actuated by a suitable actuator (not shown), which can be secured to the manifold 40.

In the illustrated embodiment, the valve seat comprises a ring 90 formed separately from the manifold 40 and mounted in the bypass passage 42. The bypass passage is stepped such that there is a portion of relatively smaller diameter, stepping up to a portion of relatively larger diameter, the step thereby defining a wall 43 that is substantially perpendicular to the axis of the bypass passage. The wall 43 surrounds the smaller-diameter portion of the bypass passage. The ring includes a hollow cylindrical portion 92 and a flange 94 that extends radially outwardly from one end of the cylindrical portion 92 and defines a sealing surface 96 for engagement by the valve member 82. The wall 43 of the manifold 40 defines an annular recess 98 surrounding the bypass passage, and the cylindrical portion 92 of the ring 90 is received in the recess 98. The wall 43 also defines a groove 100 surrounding the recess 98 for retaining a resiliently compressible sealing ring 102 in such a manner that the sealing ring can be compressed between the bottom of the groove 100 and the flange 94 of the valve seat ring 90. The ring 90 is releasably fastened to the manifold 40 (e.g., by threaded fasteners, not shown) so as to urge the ring toward the manifold to compress the sealing ring 102 between the flange 94 and the groove 100, thereby sealing the interface between the valve seat and the manifold.

This valve seat construction provides mechanical decoupling between the ring 90 and the manifold 40 such that deformations of the valve seat caused by thermally induced deformation of the manifold are significantly reduced. The L-shaped cross section of the valve seat ring 90 also provides stiffness in both axial and radial directions so as to reduce deformations in both directions. The resulting improvement in geometric and dimensional stability of the valve seat provides improved sealing performance of the bypass valve over time and with varying temperature. The separate formation of the ring 90 also enables the ring to be made from a different material from that of the manifold 40. This can be advantageous in that the ring can be made of a high-performance material while the manifold can be formed of a less-costly material because the performance requirements of the manifold are less stringent than those of the ring.

The provision of the exhaust manifold 40 housing the bypass passage 42 and bypass valve 80 as well as the inter-turbine passage 48 enables a reduction in the number of seals needed for forming the various connections between the turbine housings and the engine exhaust manifold. In the illustrated embodiment of FIG. 2, there are only two flange joints required for connecting the turbines to each other and to the exhaust manifold and bypass passage. Consequently, the manifold construction facilitates a reduction in exhaust gas leakage and therefore an improvement in turbocharger performance. The simplified construction also can reduce the overall cost of the system.

The manifold construction effectively divides the exhaust system into three subsystems: high-pressure turbocharger, low-pressure turbocharger, and bypass assembly. Each of these can be repaired and maintained independently of the others. Furthermore, when the bypass valve actuator is fixed to the exhaust manifold 40, repair and maintenance of the system are further facilitated because repair or replacement of any of the three subsystems does not require calibration operations, since the subsystems are independent and are interconnected by simple flange joints.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A two-stage turbocharger system for an internal combustion engine, comprising:
   a high-pressure turbocharger comprising a high-pressure turbine housing defining an exhaust gas inlet and an exhaust gas outlet commonly located at one end of the high-pressure turbine housing;
   a low-pressure turbocharger comprising a low-pressure turbine housing defining an exhaust gas inlet at one end of the low-pressure turbine housing;
   an exhaust manifold formed separately from the high-pressure and low-pressure turbine housings and structured and arranged to be coupled to an engine to receive exhaust gas from the engine, the exhaust manifold having a first end and an opposite second end, and defining an inter-turbine passage having an inlet and an outlet and further defining a bypass passage having a first end and an opposite second end, and a bypass valve mounted in the exhaust manifold, the bypass valve being movable between a closed position closing the bypass passage and an open position opening the bypass passage, the inlet of the inter-turbine passage and the first end of the bypass passage being commonly located at the first end of the exhaust manifold, the outlet of the inter-turbine passage and the second end of the bypass passage being commonly located at the second end of the exhaust manifold;
   the one end of the high-pressure turbine housing being releasably connected by a single joint to the first end of the exhaust manifold such that the exhaust gas outlet of the high-pressure turbine housing is connected to the inlet of the inter-turbine passage and the exhaust gas inlet of the high-pressure turbine housing is connected to the first end of the bypass passage; and
   the one end of the low-pressure turbine housing being releasably connected by a single joint to the second end of the exhaust manifold such that the exhaust gas inlet of the low-pressure turbine housing is connected to the outlet of the inter-turbine passage and to the second end of the bypass passage.

2. The two-stage turbocharger system of claim 1, wherein the first end of the exhaust manifold defines a first flange and the second end of the exhaust manifold defines a second flange, and each of the high- and low-pressure turbine housings defines a flange at the one end thereof, and wherein a first flange joint is formed between the flange of the high-pressure turbine housing and the first flange of the exhaust manifold, and a second flange joint is formed between the flange of the low-pressure turbine housing and the second flange of the exhaust manifold.

3. The two-stage turbocharger system of claim 1, wherein the bypass valve comprises a swing valve comprising a valve member held by a swing arm that pivots about an axis fixed in the exhaust manifold, and a valve seat disposed in the exhaust manifold for engagement by the valve member when the bypass valve is in the closed position.

4. The two-stage turbocharger of claim 3, wherein the valve seat comprises an insert formed separately from the exhaust manifold and mounted in the exhaust manifold.

5. The two-stage turbocharger of claim 4, wherein the valve seat comprises a ring having a cylindrical portion and a flange joined to one end of the cylindrical portion and extending radially outwardly from said one end, the exhaust manifold comprising a wall surrounding the bypass passage, the wall defining an annular recess in which the cylindrical portion of the valve seat is received, the wall further defining a groove surrounding the recess, a resiliently compressible sealing ring being disposed in the groove and engaging the flange of the valve seat, the flange compressing the sealing ring to form a sealed connection between the valve seat and the exhaust manifold.

6. An exhaust manifold for releasably coupling with high-pressure and low-pressure turbine housings of a two-stage turbocharger system, the exhaust manifold comprising:
   a manifold member structured and arranged to be coupled to an engine to receive exhaust gas from the engine, the manifold member having a first end and an opposite second end, and defining an inter-turbine passage having an inlet and an outlet and further defining a bypass passage having a first end and an opposite second end, and a bypass valve mounted in the manifold member, the bypass valve being movable between a closed position closing the bypass passage and an open position opening the bypass passage, the inlet of the inter-turbine passage and the first end of the bypass passage being commonly located at the first end of the manifold member, the outlet of the inter-turbine passage and the second end of the bypass passage being commonly located at the second end of the manifold member.

7. The exhaust manifold of claim 6, further comprising a first flange located at the first end of the manifold member proximate the inlet of the inter-turbine passage and the first end of the bypass passage, and a second flange located at the second end of the manifold member proximate the outlet of the inter-turbine passage and the second end of the bypass passage.

8. The exhaust manifold of claim 6, wherein the bypass valve comprises a swing valve comprising a valve member held by a swing arm that pivots about an axis fixed in the exhaust manifold, and a valve seat disposed in the manifold member for engagement by the valve member when the bypass valve is in the closed position.

9. The exhaust manifold of claim 8, wherein the valve seat comprises an insert formed separately from the manifold member and mounted in the manifold member.

10. The exhaust manifold of claim 9, wherein the valve seat comprises a ring having a cylindrical portion and a flange joined to one end of the cylindrical portion and extending radially outwardly from said one end, the manifold member comprising a wall surrounding the bypass passage, the wall defining an annular recess in which the cylindrical portion of the valve seat is received, the wall further defining a groove surrounding the recess, a resiliently compressible sealing ring being disposed in the groove and engaging the flange of the valve seat, the flange compressing the sealing ring to form a sealed connection between the valve seat and the manifold member.

11. A two-stage turbocharger system for an internal combustion engine, comprising:

a high-pressure turbocharger comprising a high-pressure turbine housing defining an exhaust gas inlet and an exhaust gas outlet;

a low-pressure turbocharger comprising a low-pressure turbine housing defining an exhaust gas inlet;

an exhaust manifold formed separately from the high-pressure and low-pressure turbine housings and structured and arranged to be coupled to an engine to receive exhaust gas from the engine, the exhaust manifold having a first end and an opposite second end, the exhaust manifold defining an inter-turbine passage having an inlet and an outlet and further defining a bypass passage having a first end and an opposite second end, and a bypass valve mounted in the exhaust manifold, the bypass valve being movable between a closed position closing the bypass passage and an open position opening the bypass passage, the inlet of the inter-turbine passage and the first end of the bypass passage being commonly located at the first end of the exhaust manifold, the outlet of the inter-turbine passage and the second end of the bypass passage being commonly located at the second end of the exhaust manifold; and the exhaust gas inlet of the high-pressure turbine housing being connected to the first end of the bypass passage, the exhaust gas outlet of the high-pressure turbine being connected to the inlet of the inter-turbine passage, and the exhaust gas inlet of the low-pressure turbine housing being connected to the outlet of the inter-turbine passage and to the second end of the bypass passage.

* * * * *